H. L. HATHAWAY.
METHOD OF MAKING WOVEN BELTING.
APPLICATION FILED FEB. 26, 1913.
1,183,194.
Patented May 16, 1916.
2 SHEETS—SHEET 2.
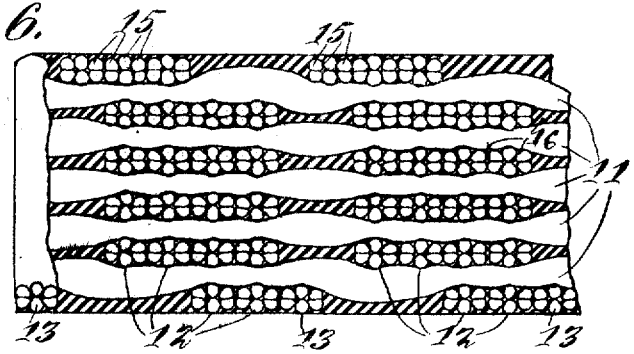
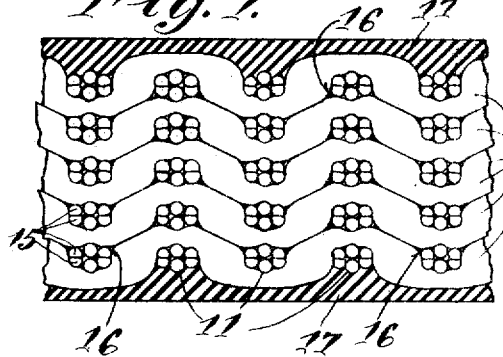
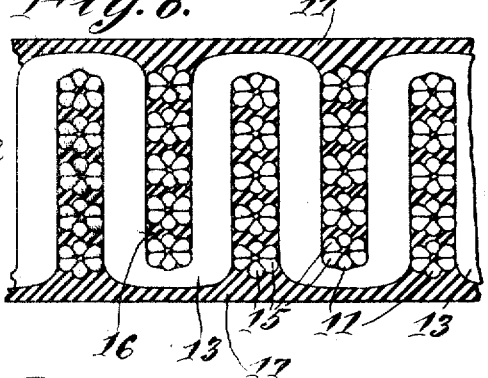
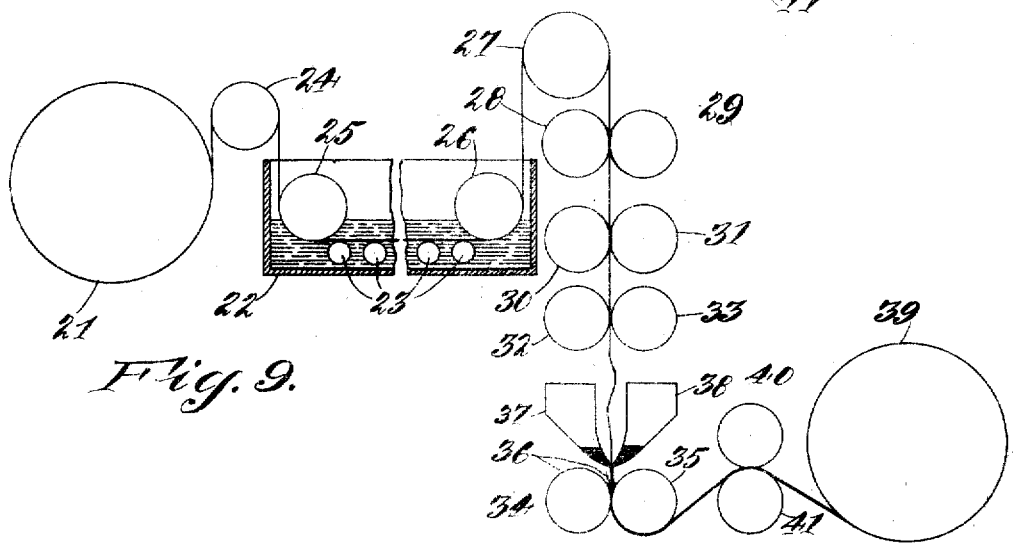
Witnesses.
Jacob A. Hollander
Theresa M. Silber
Inventor:
Henry L. Hathaway,
by H. F. Herbslet
His Attorney

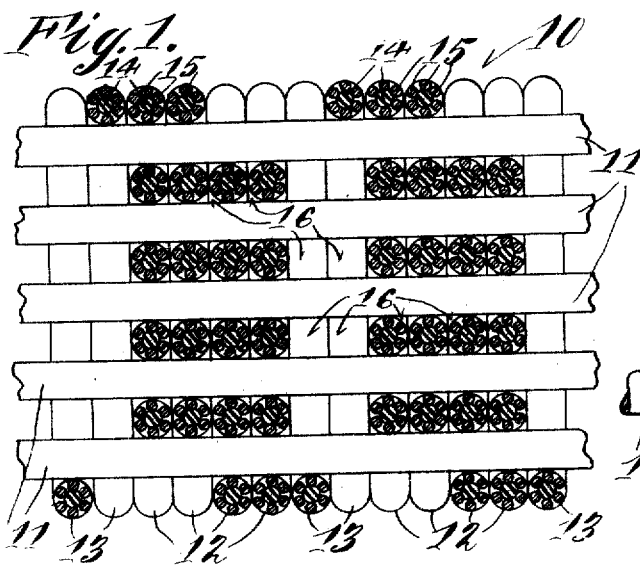

UNITED STATES PATENT OFFICE.

HENRY L. HATHAWAY, OF CINCINNATI, OHIO.

METHOD OF MAKING WOVEN BELTING.

1,183,194.                 Specification of Letters Patent.           Patented May 16, 1916.

Application filed February 26, 1913. Serial No. 750,807.

*To all whom it may concern:*

Be it known that I, HENRY L. HATHAWAY, a citizen of the United States, residing at Cincinnati, in the county of Hamilton and State of Ohio, have invented certain new and useful Improvements in Methods of Making Woven Belting, of which the following is a specification.

The article known in the arts as rubber belting has heretofore, when made under one method in quite general use, consisted of a textile fabric body, the several plies of which were provided with a coating of rubber composition applied at the outside of the several plies, and the plies then superposed and subjected to pressure; and, when made under another method consisted of a textile fabric body consisting of a plurality of connected plies, the said textile body being provided with an exterior coating of rubber and pressed. Rubber belting made under the first method mentioned is subject to the objection that the plies, under operative conditions, will separate, and rubber belting made under the latter method is subject to the objection that the rubber fails to permeate the fabric and fails to properly impregnate the same, for the reason that the textile fabric acts in the nature of a filter and permits only the more fluid constituents of the rubber composition to penetrate the interior of the belting, with the result that the interior plies are held together substantially solely by the texture of the fabric.

It is the object of my invention to provide a new and improved method of making rubber belting in which the rubber composition homogeneously impregnates the textile fabric; further to provide a new and improved method of making woven belting comprising strands which comprise yarn and a proofing substance; further to provide a new and improved method of making woven belting having strings of proofing substance interlaced therein and pressed; and the invention consists in a new and improved method of making belting and the steps thereof herein referred to and claimed.

The invention will be further readily understood from the following description and claims, and from the drawings.

I have illustrated my invention as applied in a five-ply woven belting as an exemplification, but I desire it to be understood that my invention relates to woven belting of one or more plies, and I claim my invention irrespective of the number of plies, as my invention is applicable to single or multi-ply belting.

I do not herein claim the belting herein shown and described, reserving the claims for the belting for another application to be filed by me divisional hereof.

In the drawings: Figure 1 is a cross-section of a piece of woven fabric, broken away at its ends, the strands of which are provided with strings of proofing substance. Fig. 2 is a longitudinal section of the same taken on a line to expose the warp-strands of the several plies. Fig. 3 is a similar section taken on a line to expose one of the binder-strands. Fig. 4 is an enlarged cross-section of a strand of the woven fabric. Fig. 5 is an enlarged side elevation of a piece of the same. Fig. 6 is a cross-section of a piece of my improved woven belting. Fig. 7 is a longitudinal section of the same, taken on a line to expose the warp-strands of the several plies, and provided with an exterior coating of proofing substance. Fig. 8 is a similar section of the same, taken on a line to expose one of the binder-strands, and provided with an exterior coating of proofing substance; and Fig. 9 is a diagrammatic representation of an exemplified machine in which my improved belting is stretched and pressed.

The fabric is woven, as indicated at 10. I have illustrated the same as comprising weft-strands 11, 11, warp-strands 12, 12, and binder-strands 13, 13, the strands comprising a string 14 of proofing substance shown as the core of the strand, about which the yarn, shown at 15, is twisted in a suitable spinning operation.

The proofing substance is a suitable substance impervious or substantially impervious to moisture, acids, gases, or other deteriorating agencies, to which the belting may be subjected, dependent on the purpose for which or the location in which the belting may be employed. This proofing substance may be instanced as rubber, such as india rubber, gutta percha, balata gum, or similar substance, or compounds or compositions containing the same.

The proofing substance is preferably first reduced to a plastic or semi-fluid state, by heat, or by manipulation. It may be substantially unvulcanized rubber, or composition containing the same. The proofing substance is formed into a string, such as 14.

The fibrous yarn may be cotton, flax, hemp, or other suitable fiber, spun about the string of proofing substance.

The woven fabric 10, woven with the composite strands of fiber yarn and proofing substance, is preferably subjected to the action of a dissolving agent, for instance, benzin, to soften the proofing substance and reduce it to a permeable condition for impregnating the yarn and being squeezed into the interstices 16 between the strands. Reducing the proofing substance to a condition to permit impregnation of the yarn and its reception in the interstices may also be accomplished or aided by heat. The woven fabric is further subjected to compression, or so-called calendering with compression rollers, whereby the proofing substance is caused to impregnate the fibrous material and to fill the interstices between the strands, whereby the fibers of the yarn and the yarns of the stretches are bound together homogeneously. The woven fabric may be further subjected to stretching, and this stretching may take place concomitantly with the compression, and preferably be a stretching lengthwise of the belting, so that elongation of the finished belting will be resisted primarily by the fibrous structure or fabric of the belting.

If desired, the woven fabric may also be provided all about the same with an exterior coating 17 of proofing substance, concomitantly with the compression heretofore mentioned, or as a subsequent step.

The compressed structure is further cured, which, when an india rubber proofing is employed, may consist in vulcanization, or such other step as the particular proofing substance employed may require. For instance, balata gum ordinarily requires merely a heating and cooling.

My improved woven belting presents a structure in which the proofing substance is pressed outwardly from within the strands comprised in the woven fabric, the proofing substance being interlaced with the strands, and presents a structure in which the proofing substance binds the fibers and yarns together homogeneously throughout the entire structure. The proofing substance also acts as a resistant to abrasive action from external wear and friction. It impregnates the entire structure. The woven structure is further bound together by the frequently recurring binder-strands. The result is that my improved woven belting is exceptionally strong and durable and presents a structure thoroughly impregnated with proofing substance and bound together by the fibers of the structure, irrespective of the amount of surface wear which the belt may have sustained in use, for at all times presenting a strong surface exceptionally resistant to rupture and having the proper gripping properties in power transmission. My improved woven belting is also applicable for conveyer belts and other uses to which belting is or may be applied.

I have, in the drawings, diagrammatically outlined an exemplifying machine in which my improved woven fabric may be treated.

The fabric is shown as received from a drum 21 into a tank 22. This tank has a suitable dissolving agent therein, of which benzin may be instanced as an example, for reducing the proofing substance to a condition of permeability to permit impregnation of the fibers and filling of the interstices by pressure. A bath is thus formed through which the woven fabric passes, the latter being supported for instance by supporting rollers 23. The woven fabric is shown as passing about directing rollers 24, 25, 26, 27.

Suitable pressing agencies are employed. Thus a pair of rollers 28, 29, act on the woven fabric for preferably slightly squeezing the same. These rollers are preferably heated.

30, 31, are a pair of rollers between which the woven fabric is pressed. These rollers are preferably heated. The heating of the rollers aids in rendering the proofing substance permeable. The rollers 30, 31, preferably rotate at greater peripheral speed than the peripheral speed of the rollers 28, 29, for stretching the woven fabric between the two sets of rollers, and acting with pressure upon the woven fabric in its stretched condition. 32, 33, are a pair of rollers which also act preferably with pressure upon the treated woven fabric and are preferably heated. The action of the pressure rollers is such as to compress the woven fabric and to cause impregnation of the fibers and yarn with the proofing substance, to squeeze the cores of proofing substance outwardly, to cause filling of the interstices of said strands with said proofing substance, and to provide the exterior surface of the fabric with a coating of the proofing substance. A suitable number of the pressing agencies may be employed.

If desired, the treated fabric may be provided with an additional or thicker exterior coating 17 of the proofing substance, which is shown applied at the rollers 34, 35, which form a trough 36 through which the treated fabric passes, and by which the treated fabric is subjected to pressure.

The interior proofing substance is squeezed outwardly and the exteriorly applied coating is squeezed inwardly, the proofing substances forming a homogeneous mass impregnating the fibrous structure and forming a coating therefor.

The trough 36 may be fed by a pair of reservoirs 37, 38, one of which is shown at each side of the fibrous structure. From the rollers 34, 35, the treated structure may pass to and be wound on a suitable drum 39, passing between a pair of rollers 40, 41. The various rollers may be heated, as by steam passing therethrough, and the rollers may also be provided with suitable adjusting and pressure mechanisms.

If a proofing substance containing unvulcanized rubber is employed, the impregnated structure may be subjected to vulcanization. The proofing substance is subject to such curing steps as may be required by the nature of the proofing substance employed. This curing step is such as may be best adapted for the purpose. It is usually applied after the compression of the structure.

Having thus fully described my invention, what I claim as new and desire to secure by Letters Patent, is:

1. The process of making belting which consists in weaving a textile fabric comprising strands which respectively comprise yarn and a proofing substance as a core about which said yarn is spun, and subjecting said fabric to pressure for impregnating said textile fabric with said proofing substance.

2. The process of making belting which consists in weaving a textile fabric comprising strands which respectively comprise yarn and a proofing substance about which said yarn is spun as a core, treating said fabric for reducing said proofing substance into permeable state, and subjecting said fabric to pressure, whereby the yarn of said strands is impregnated from within said strands.

3. The process of making belting which consists in weaving a textile fabric comprising strands which respectively comprise yarn and a proofing substance about which said yarn is spun as a core, rendering said proofing substance permeable, subjecting the same to pressure, and curing said proofing substance.

4. The process of making belting which consists in weaving a textile fabric comprising strands which respectively comprise yarn and a proofing substance as a core about which said yarn is spun, rendering said proofing substance permeable, applying a coating of permeable proofing substance to said textile fabric, subjecting said coated textile fabric to pressure, and curing said proofing substance.

5. The process of making belting which consists in weaving a textile fabric comprising strands which respectively comprise yarn and a proofing substance as a core about which said yarn is spun, said textile fabric having interstices between said strands, rendering said proofing substance permeable, subjecting said textile fabric to pressure, and applying a surface coating of proofing substance to said fabric whereby said yarn is impregnated and said interstices filled with said proofing substance.

6. The process of making belting which consists in weaving a textile fabric comprising strands which respectively consist of a string of proofing substance surrounded as a core by yarn, said textile fabric having interstices between adjacent strands, rendering said cores permeable, and subjecting said textile fabric to pressure whereby said cores are pressed in outward directions for impregnating said yarn from within said strands and filling said interstices.

7. The process of making belting, which consists in forming a strand with a core of plastic proofing substance surrounded by the twisted yarn which forms the fibrous structure of said strand, weaving strands so formed into a fabric, reducing said cores of proofing substance to permeable state, and subjecting said fabric to pressure while said cores are in permeable state for impregnating said yarn thereabout from within said strands with proofing substance of said cores by expression in the individual strands of said fabric.

8. The process of making belting, which consists in forming a strand with a core of plastic proofing substance surrounded by the twisted yarn which forms the fibrous structure of said strand, weaving strands so formed into a fabric, reducing said cores of proofing substance to permeable state, subjecting said fabric to pressure while said cores are in permeable state for impregnating said yarn thereabout from within said strands with proofing substance of said cores by expression in the individual strands of said fabric, and curing said treated fabric.

9. The process of making belting, which consists in forming a strand with a core of plastic proofing substance surrounded by the twisted yarn which forms the fibrous structure of said strand, weaving strands so formed into a fabric having interstices between said strands, reducing said cores of proofing substance to permeable state, and subjecting said fabric to pressure while said cores are in permeable state for impregnating said yarn with proofing substance of said cores from within said strands by expression in the individual strands of said fabric and injecting proofing substance of said cores into the interstices between said strands.

10. The process of making belting, which consists in forming a strand with a core of plastic proofing substance surrounded by the twisted yarn which forms the fibrous structure of said strand, weaving a fabric comprising a plurality of plies and interlaced binders composed of strands so formed, reducing said cores of proofing substance to permeable state, subjecting said fabric to pressure while said cores are in permeable state for impregnating said yarn with proofing substance of said cores from within said strands by expression in the individual strands of said fabric and injecting proofing substance of said cores into the interstices between said strands, and curing said treated fabric.

11. The process of making belting, which consists in forming a strand with a core of plastic proofing substance surrounded by the twisted yarn which forms the fibrous structure of said strand, weaving a fabric comprising a plurality of plies and interlaced binder composed of strands so formed, reducing said cores of proofing substance to permeable state, subjecting said fabric to stretching and to pressure while said cores are in permeable state for impregnating said belting by expression in the individual strands of said fabric through said yarn from within said individual strands.

12. The process of making belting, which consists in forming plastic proofing substance in uncured state into a string, spinning yarn about said string for forming a spun strand having said string of proofing substance as a core, weaving strands so formed and while said cores are in uncured state into a fabric having interstices between said strands, providing said fabric with a surface coating of proofing substance, and subjecting said coated fabric to heat and pressure whereby the individual cores of said individual strands are pressed outwardly in said individual strands for permeating the yarns thereof and filling the interstices between said strands.

13. The process of making belting, which consists in forming a strand with a core of plastic proofing substance surrounded by the twisted yarn which forms the fibrous structure of said strand, weaving a fabric comprising a plurality of plies and interlaced binders composed of strands so formed, reducing said cores of proofing substance to permeable state, subjecting said fabric to stretching and pressure while said cores are in permeable state for impregnating said yarn by expression in the individual strands of said fabric, and curing said treated fabric.

14. The process of making belting, which consists in forming a strand with a core of plastic proofing substance surrounded by the twisted yarn which forms the fibrous structure of said strand, weaving a fabric comprising a plurality of plies and interlaced binders composed of strands so formed, reducing said cores of proofing substance to permeable state, subjecting said fabric to stretching and pressure in the presence of a surface coating of proofing substance whereby said first-named proofing substance and surface coating are homogeneously connected by expression of said first-named proofing substance in the individual strands of said fabric and by injection of said surface coating.

In testimony whereof, I have hereunto signed my name in the presence of two subscribing witnesses.

HENRY L. HATHAWAY.

Witnesses:
THERESA M. SILBER,
CHARLES E. WEBER.

It is hereby certified that in Letters Patent No. 1,183,194, granted May 16, 1916, upon the application of Henry L. Hathaway, of Cincinnati, Ohio, for an improvement in "Methods of Making Woven Belting," errors appear in the printed specification requiring correction as follows: Page 3, lines 37 and 47, claims 2 and 3, after the word "substance" insert the words *as a core;* same page and claims, lines 38 and 48, strike out the words "as a core"; and that the said Letters Patent should be read with these corrections therein that the same may conform to the record of the case in the Patent Office.

Signed and sealed this 25th day of July, A. D., 1916.

[SEAL.]

F. W. H. CLAY,

*Acting Commissioner of Patents.*

Cl. 154—4.